Feb. 12, 1935. H. A. MOORE ET AL 1,990,745
WARE HANDLING AND TRANSFER MECHANISM
Filed Nov. 19, 1931 7 Sheets-Sheet 3
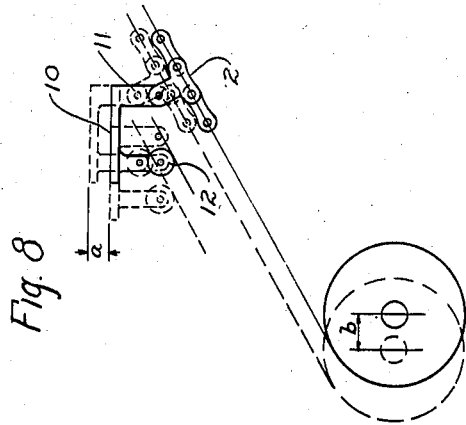
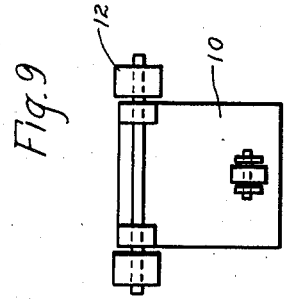
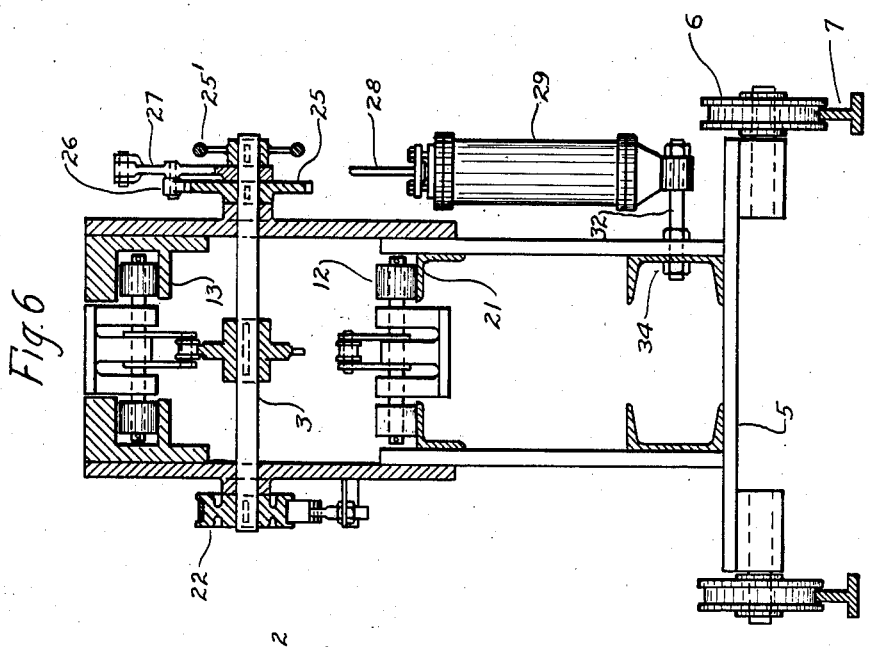
INVENTORS
Harold A. Moore
Carl A. Nielsen
BY William B. Jaspert
ATTORNEY.

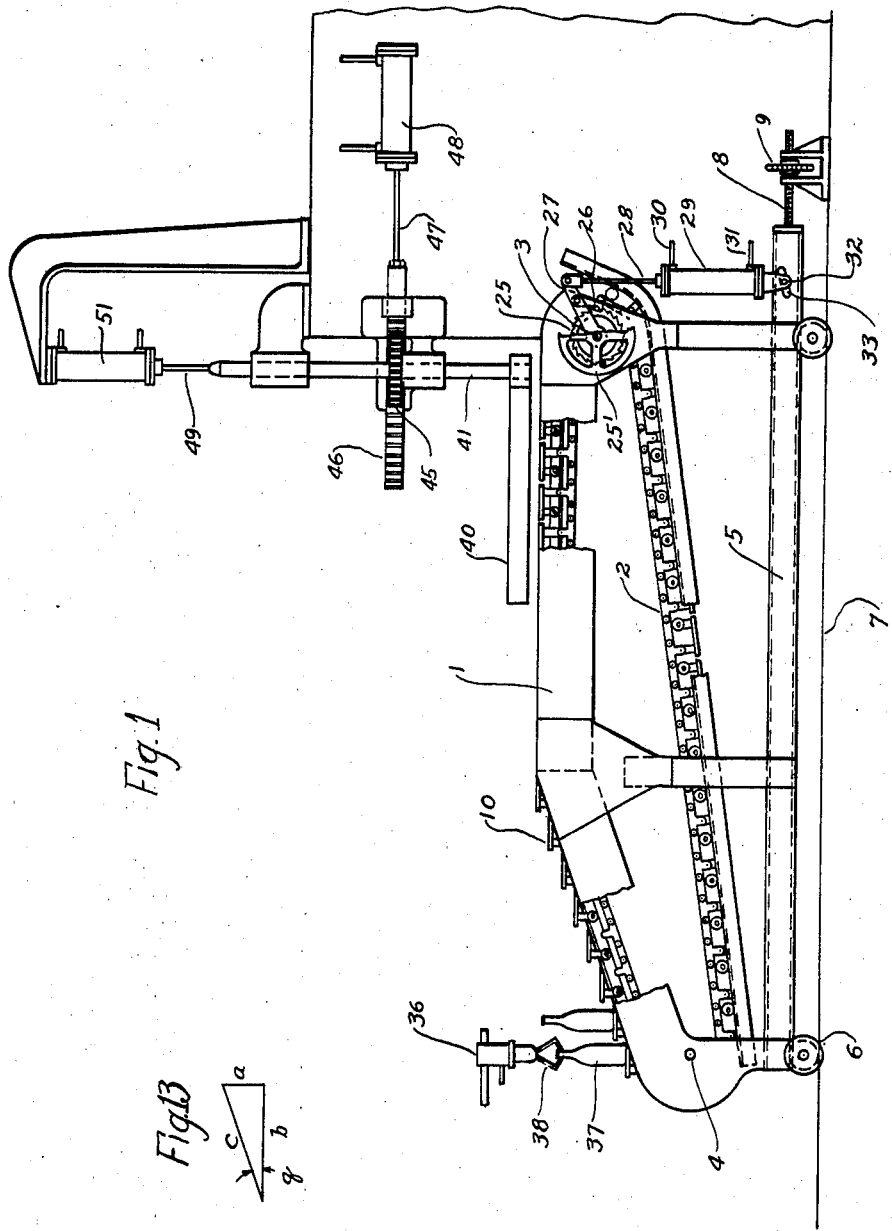

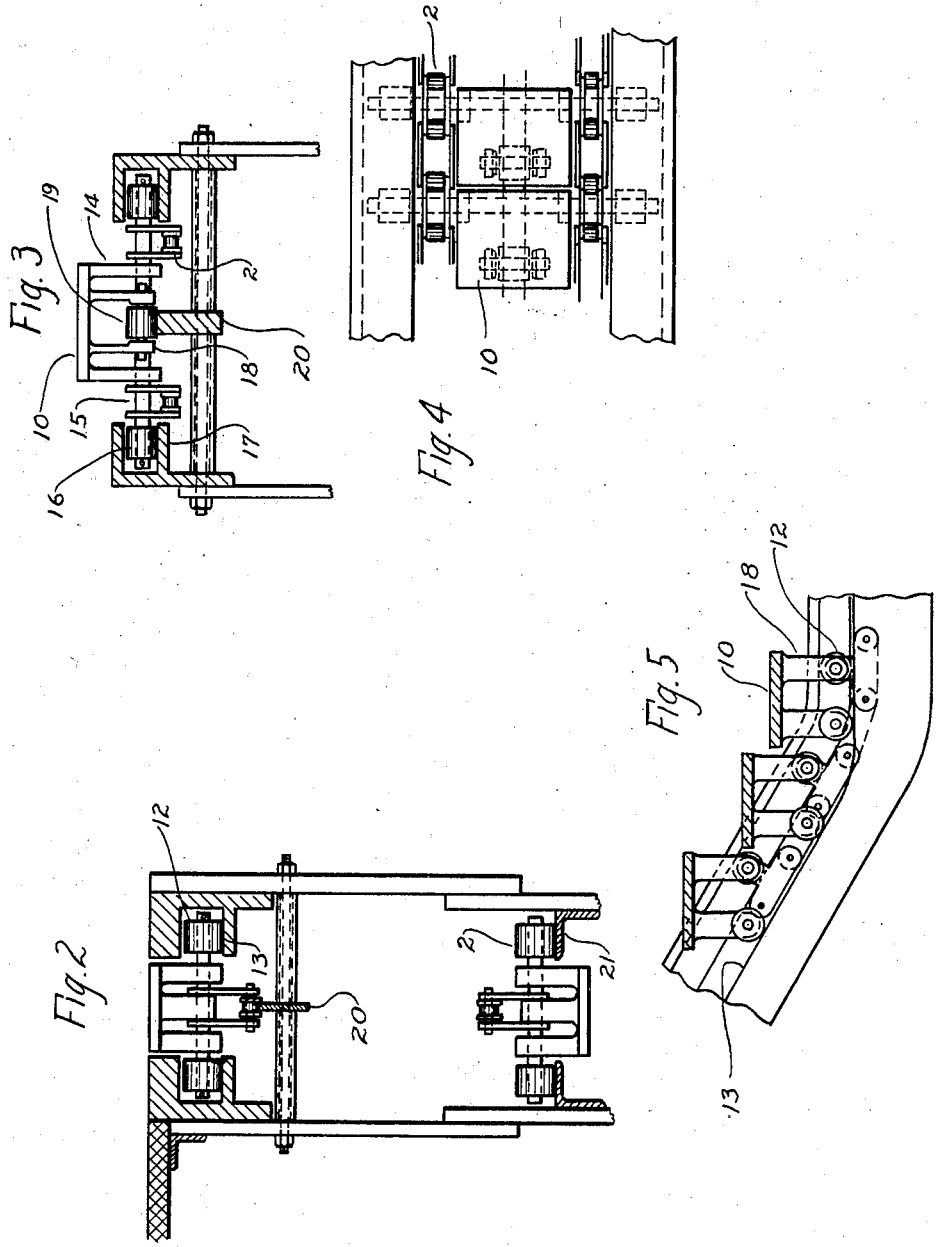

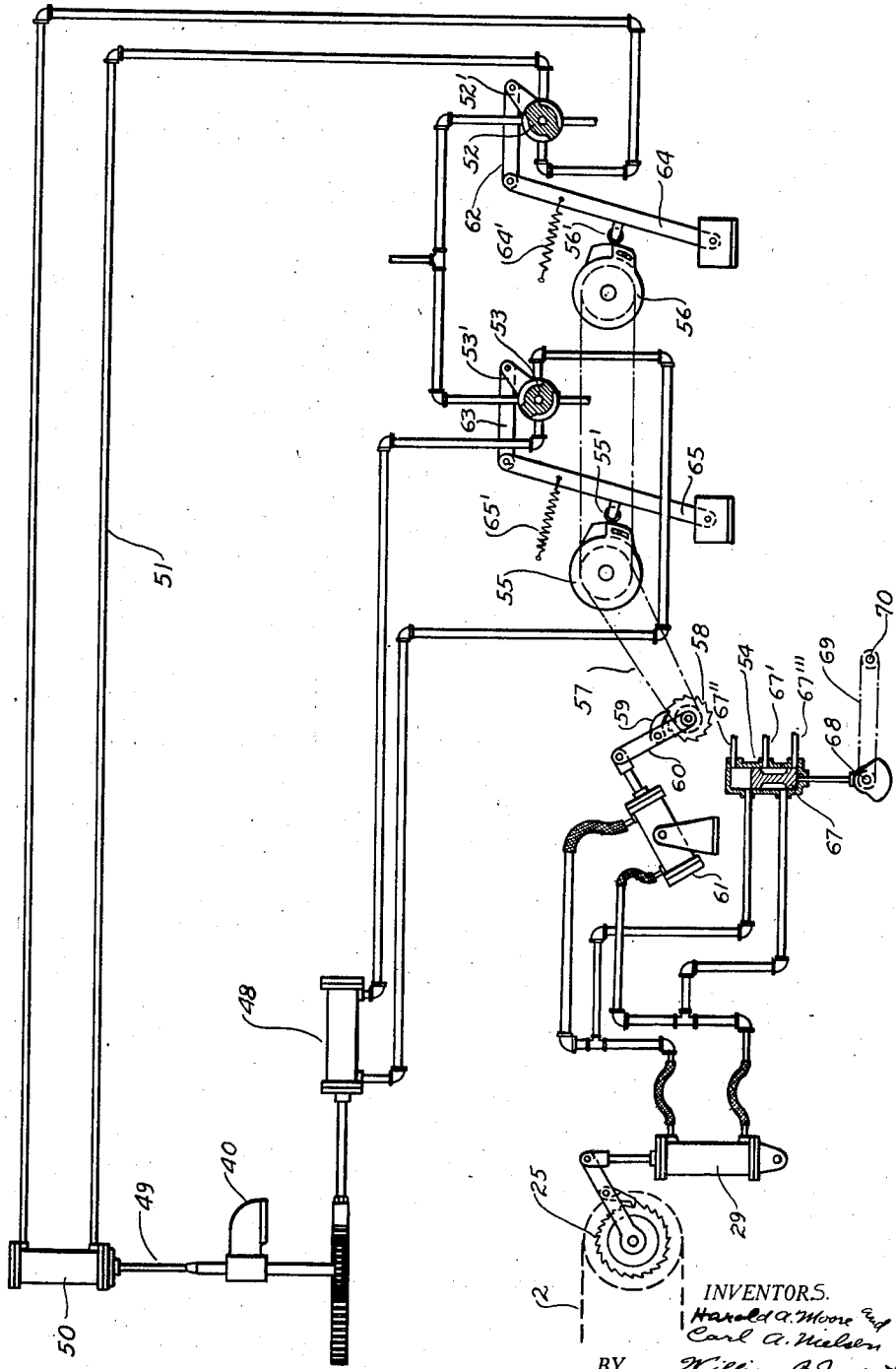

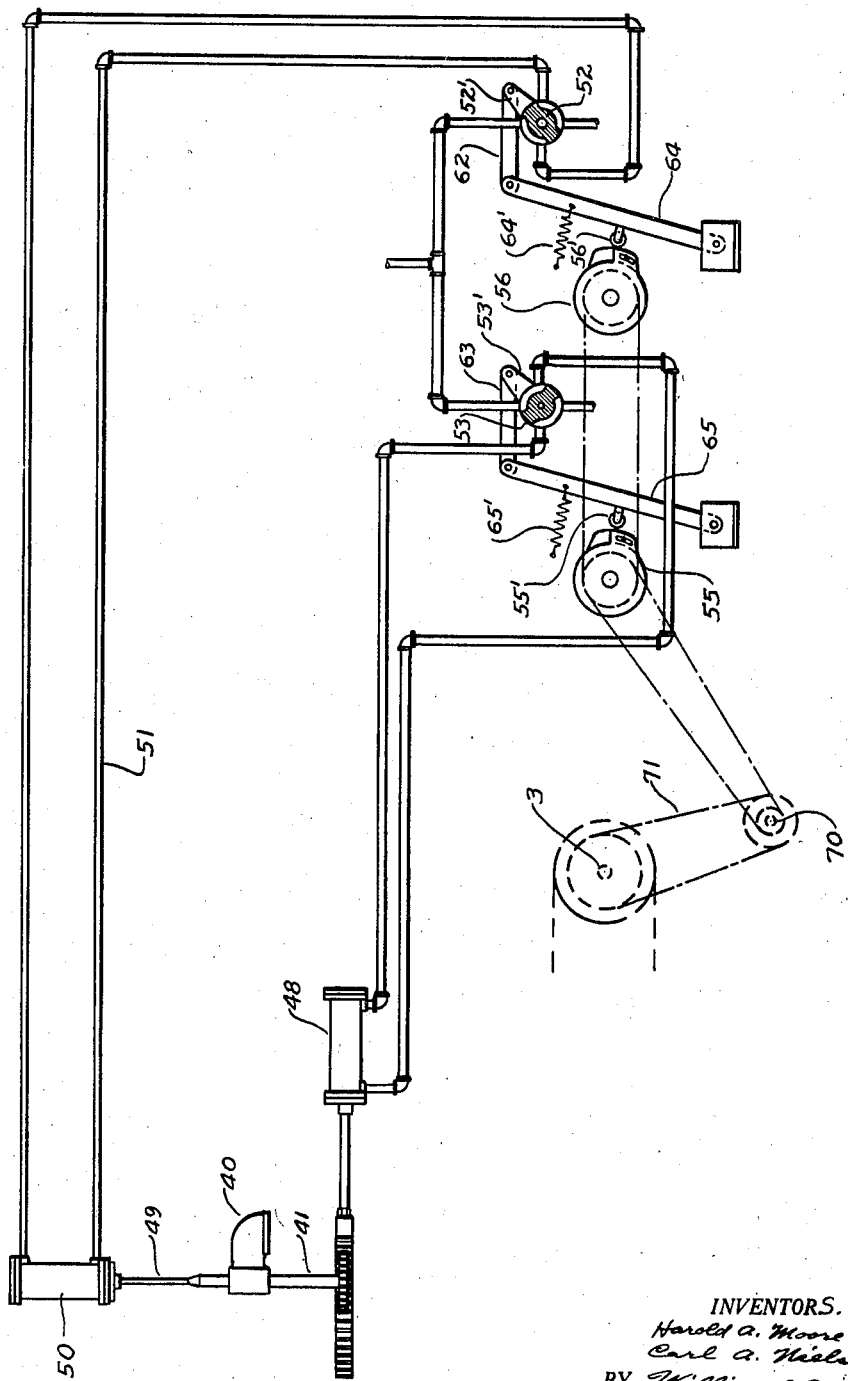

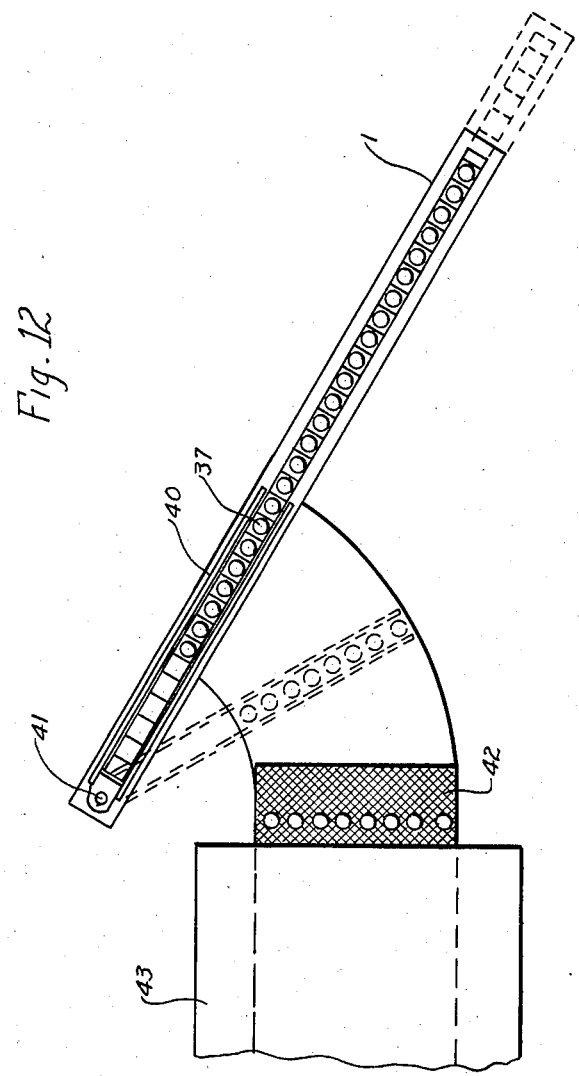

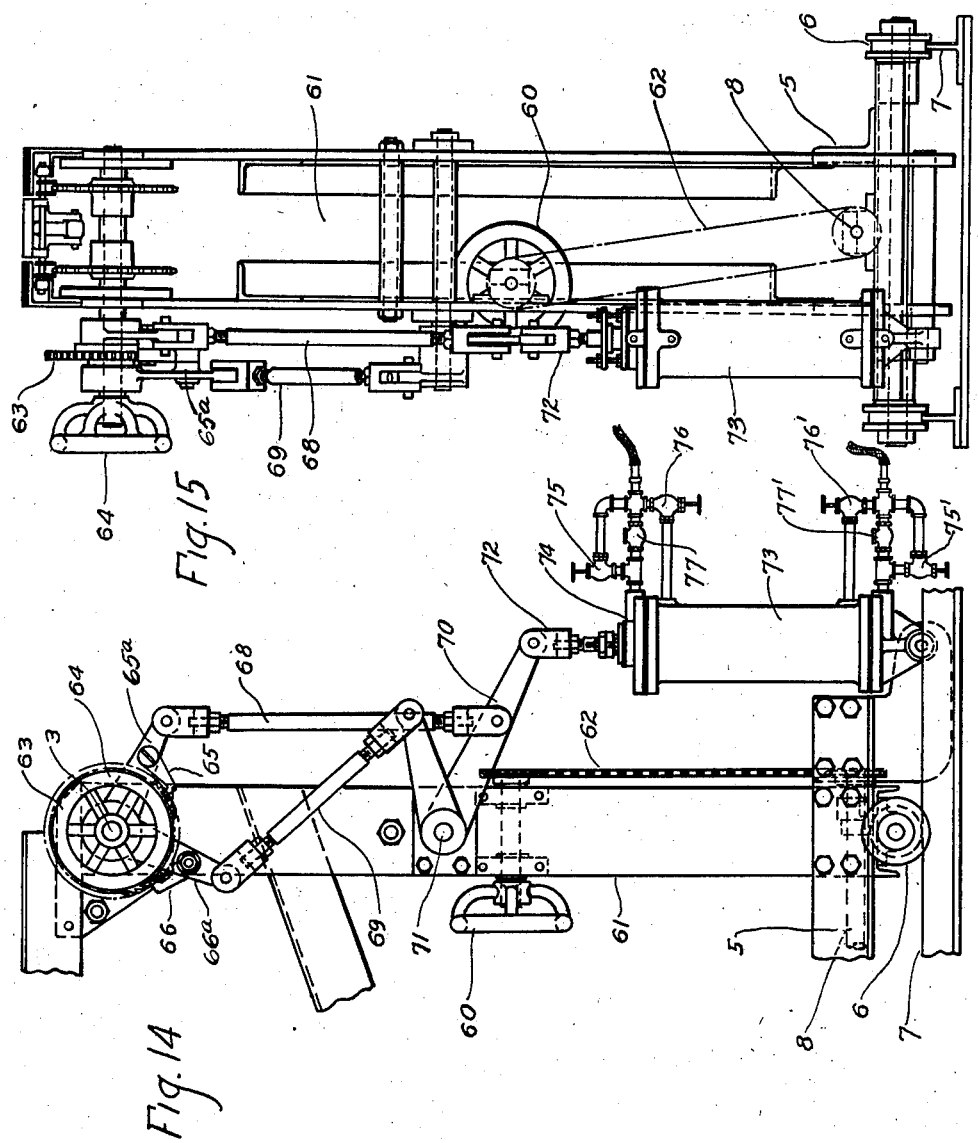

Patented Feb. 12, 1935

1,990,745

UNITED STATES PATENT OFFICE 1,990,745

WARE HANDLING AND TRANSFER MECHANISM

Harold A. Moore, Wilkinsburg, and Carl A. Nielsen, Pittsburgh, Pa., assignors, by mesne assignments, to Amco, Incorporated, Pittsburgh, Pa., a corporation of Pennsylvania Application November 19, 1931, Serial No. 576,078

9 Claims. (Cl. 198—31)

This invention relates to ware handling mechanism more particularly to apparatus for receiving ware from a glass forming machine and transferring the same in rows onto a lehr conveyor and it is among the objects thereof to provide a ware receiving and conveying apparatus which shall be adjustable to receive ware of different height from a fixed discharge point.

In the loading of glassware from a forming machine to the conveyor of a glass annealing lehr, an inclined conveyor commonly termed an escalator buck is employed on account of the fact that the forming machine by which the ware is delivered is customarily at a lower level than the receiving platform or belt of the glass annealing lehr.

Provision must be made to adjust the ware receiving plates or paddles of the escalator to substantially the horizontal level of the base of the ware, and such adjustment is accomplished in the operation of the herein disclosed apparatus by simple and expedient means.

Further objects and detailed construction of the apparatus will become more apparent from a consideration of the accompanying drawings constituting a part hereof, in which like reference characters designate like parts, and in which:

Figure 1 is a side elevational view diagrammatically illustrating a ware delivering mechanism, an escalator buck, and a transfer arm for handling and conveying glassware in accordance with the principles of this invention;

Figures 2 and 3 are cross-sectional views taken through the escalator buck;

Figure 4 a top plan view of the escalator buck;

Figure 5 a sectional elevational view of an escalator conveyor mechanism which is a modification of the form of conveyor shown in Figure 1;

Figure 6 a sectional elevational view of the conveyor buck and a part of the operating mechanism therefor;

Figure 7 a side elevational view of a brake employed to maintain tension on the conveyor chain;

Figure 8 a view diagrammatically illustrating the adjustment of the conveyor chain and the ware receiving plates or paddles;

Figure 9 a bottom plan view of one of the paddies and supporting rollers;

Figure 10 a diagrammatic view of the timing and valve operating mechanism for coordinating the movements of the apparatus with which the escalator buck cooperates, the apparatus being adapted to subject the conveyor to intermittent movement;

Figure 11 a diagrammatic view of valve operating mechanism in which the conveyor is operated continuously;

Figure 12 a top plan view of a conveyor buck, a transfer arm, the charging portion of a glass annealing lehr, and a portion of the conveyor belt to which the ware is transferred by sliding it over a receiving platform or apron;

Figure 13 is a diagram of the adjustments necessary for varying the height of the paddles;

Figure 14 is a side elevational view of a portion of an escalator buck illustrating a modified form of conveyor drive mechanism; and, Figure 15 is an end elevational view thereof.

With reference to Figures 1 and 12 of the drawings, the structure therein illustrated comprises an escalator buck generally designated at 1 in which an endless chain 2 is supported to pass around shafts 3 and 4, the former shaft rotatably journalling the drive drum or ratchet by means of which the belt 2 is actuated and the shaft 4 being the idle shaft around which the conveyor travels.

The sides of the conveyor chain 1 are provided with suitable sheet metal housing and the whole is supported on a frame 5 which is mounted on flanged wheels 6 that are movable on a track 7.

The escalator buck is movable on the tracks 7 through an adjusting screw mechanism 8 operated by a hand wheel 9. By rotating the hand wheel the escalator buck is subjected to movement in a horizontal direction.

The conveyor chain 2 is provided with a series of plates or paddles 10 which are pivotally connected to the links of the chain at 11 in the manner shown in Figures 2 to 8 of the drawings, one end of the plate being provided with a roller 12 that operates on the track 13 shown in Figure 6 of the drawings. In the modification shown in Figure 3, one pair of depending legs 14 of the paddles 10 carry a shaft 15 on the ends of which are provided rollers 16 that travel in the tracks 17. The chain 2 is fastened to the shafts 15 of the paddles 10 to maintain them in proper spaced relation. Paddles 10 are provided with inner legs 18 having rollers 19 that engage a support 20 to maintain the paddles with their ware supporting surfaces in a horizontal plane.

In Figures 2 and 6 both the ware supporting and return strands of the buck conveyor are shown supported in tracks by their rollers 12.

With reference to Figure 6 of the drawings, the drive shaft 3 is provided with a brake mechanism 22 shown in Figure 7 which is provided with a strap 23 that is adjustable through the nut 24 to vary the degree of tension desired on the drive shaft.

One end of the shaft 3 is provided with a ratchet wheel 25 which is actuated through a pawl 26 mounted on an oscillating lever 27 which is connected by a piston rod 28 to a fluid pressure piston disposed in an operating cylinder 29. The cylinder is connected with a fluid pressure or exhaust source as will be hereinafter explained. A hand wheel 25' is mounted on shaft 3 to subject it to angular movement for adjusting the position of the paddles 10.

The bottom of cylinder 29 is supported on a pin 32 which is disposed in an arcuate slot 33 of the frame 5. By adjusting the pin 32 is said slot and securing it by the nuts 34, the cylinder 29 may be disposed at an inclination from the vertical to effect a fractional tooth adjustment of the pawl 26 with the teeth of the ratchet wheel 25.

36 designates a take-out or ware delivering device which engages the ware such as the bottles 37 as they are deposited from the finishing mold of a bottle blowing machine, the engagement being effected by the clamps or hooks 38 which engage the neck of the bottle, and the take out device 36 is extended to bring the bottle 37 in alignment with the conveyor buck.

When the ware has been delivered to the horizontal portion of the escalator buck, it travels into a bifurcated transfer arm 40 which is adapted for angular movement with the shaft 41, Figures 1 and 12. The transfer arm 40 when subjected to angular movement transfers a row of the bottles 37 to the conveyor belt 42 for conveyance through the annealing chamber of a glass annealing lehr 43.

The shaft 41 is provided with a gear wheel 45 adapted to be actuated by a gear rack 46 connected by a rod 47 to a piston disposed in a fluid pressure operating cylinder 48.

The arm 40 is adapted to be raised to clear the top of the ware or bottles after it has transferred a row of bottles onto the conveyor belt, and for this purpose, the shaft 41 is connected by a rod 49 to a fluid pressure operating cylinder 50.

It is necessary to coordinate the movements of the buck conveyor with the movements of the take out device and also the movement of the transfer arm 40 both angularly and vertically to transfer a row of ware from the buck conveyor to the lehr conveyor belt.

Apparatus for accomplishing this function is disclosed in Figures 10 and 11 of the drawings.

The structure shown in Figure 10 subjects the buck conveyor to intermittent movement and consists of the conveyor operating cylinder 29, the arm swinging cylinder 48, and the arm lifting cylinder 50. All of these cylinders being interconnected by a system of piping generally designated at 51 and cylinders 48 and 50 are controlled by valves 52 and 53 which communicate with a source of fluid pressure that is controlled by a slide valve generally designated at 54. The valves 52 and 53 that control the fluid pressure of cylinders 48 and 50 are actuated by cams 55 and 56 which are interconnected to operate simultaneously through a drive chain connection 57 operated by a ratchet wheel 58.

The ratchet 58 is actuated by a pawl 59 mounted on lever 60 which is subjected to swinging movement by a timing cylinder 61. The valves 52 and 53 are provided with levers 52' and 53' connected by links 62 and 63 with the levers 64 and 65. These last named levers are normally biased by springs 64' and 65' in the direction of cams 55 and 56 against which they rest bearing on their cam followers 55' and 56'.

The operation of the timing mechanism is controlled by a slide valve 67 mounted on a crank 68 which is rotated by a drive connection 69 with a shaft 70 that is either operated by the glass feeding mechanism or the glass forming machine.

The timing mechanism shown in Figure 11 is similar to that shown in Figure 10 with the exception that the timing cylinder 61 is omitted and the cams 55 and 56 are rotated directly from the shaft 70.

In place of the fluid pressure operated ratchet mechanism 25 for driving the conveyor 2 as shown in Figure 10, the drive drum on the conveyor shaft 3 is operated direct by a sprocket chain connection 71 with the drive shaft 70.

The operation of the above described escalator buck and its associated ware handling mechanism is briefly as follows:

In Figure 1 the escalator buck is shown in its adjusted ware receiving position in which position the plates or paddles 10 are at the proper vertical height when passing directly underneath the take-out mechanism 36.

The conveyor chain 2 is advanced through the ratchet mechanism 25 to bring the successive paddles 10 in alinement with the delivery position of the take-out 36 to receive a bottle. This step-by-step motion is controlled by the valve operating mechanism through the drive shaft 70 which is connected to operate in synchronism with the glass feeder if the glass is fed in gob form or with the ware blowing machine if the parison is formed by the suction method, although the shaft 70 may likewise be operated by or in synchronism with the machine when the gob type of feeder is employed.

Through the drive connection 69 the crank shaft 68 is actuated which in turn subjects the slide valve 67 to reciprocating movement in the casing 54. When the valve 67 is in the position shown in Figure 10 of the drawings, the cylinder 29 is exhausting through the central exhaust pipe 67' and the upper side of cylinder 29 is subjected to the fluid pressure of pipe line 67''.

The timer cylinder 61 is connected in parallel with the cylinder 29 and is similarly exhausted at one end and subjected to pressure at the other end thereby causing movement of the piston elements within the cylinders 29 and 61 which subjects the ratchet wheel 25 to angular movement thus operating the conveyor chain 2 and simultaneously indexing the ratchet 58 which subjects the cams 55 and 56 to angular movement.

Cams 55 and 56 are of the adjustable type to vary the length of the dwell for the purpose of timing the operations of valves 52 and 53.

If, for example, the cam 55 is set to rotate one revolution with the advance of 8 notches in the ratchet wheel 58, the wheel 25 will have been advanced 8 notches also, meaning that eight of the bottles 37 have been placed between the prongs of the transfer arm 40. At the same time, the high spot of cams 55 and 56 have depressed the levers 64 and 65 to the position shown in Figure 10 in which position the valves 52 and 53 have been moved to conduct fluid pressure to cylinders 48 and 50 in proper timed relation whereby the transfer arm 40 is subjected to angular movement to replace the bottles 37 from the escalator buck and transfer them in a row onto the conveyor belt 42 as shown in Figure 12. When this has been accomplished by the cylinder 48, the cylinder 50 will raise the shaft 41 and lift the transfer arm 40 clear off the ware. When the high spot of the cams 55 and 56 will have passed out of contact with followers 55' and 56', levers 64 and 65 will return to their normal position to which they are biased by the springs 64' and 65', thus manipulating the valves 52 and 53 to reverse the air in cylinders 48 and 50 whereby the arm 40 is first returned to the position shown in Figure 12 and is then lowered to envelop the row of bottles which have accumulated on the escalator buck. These operations are repeated through manipulation of the slide valve 67 in synchronism with the feeder or ware blowing machine thereby maintaining proper timed relation of the transfer of the ware from the receiving station underneath the take-out mechanism to the conveyor belt 42.

One of the primary objects of the invention is the provision of means for adjusting the level of the plates or paddles 10 with the height of the ware being delivered by the take-out mechanism 36. This is accomplished in the following manner.

With reference to Figure 8 and the diagram shown in Figure 13 of the drawings, the dotted line of Figure 8 indicates a position to which it is desired to adjust the level of the plates or paddles 10. (a) designates the difference in the height of the ware for which the escalator buck is to be adjusted, this difference being represented by the side (a) of the triangle in Figure 13.

(b) represents the horizontal adjustment which is made by the hand wheel 9 and its associated screw 8 and the angle of inclination of the escalator buck is designated by $q$.

Since the difference in the height of the ware designated by (a) is known, it is only necessary to determine the distance for moving the escalator buck on its supporting track 7, this being represented by the character (b). The distance (b) is calculated as follows:

$$b = \frac{a}{\tan q}$$

The quantity thus determined is the distance which the escalator buck should be moved either towards the take-out mechanism 36 or in the opposite direction depending on whether the ware is longer or shorter than the ware for which the escalator buck had been previously set.

After the longitudinal adjustment is made for (b) it will be necessary to bring the paddles 10 in alinement with the take-out mechanism which is accomplished by rotating the hand wheel 25' which advances the chain 2 until the plates 10 are in proper alinement. In this manner, horizontal adjustment of the ware supporting plates 10 is produced so that the plates may be absolutely centered with the center of the ware delivered by the take-out mechanism.

After the adjustment has been accomplished in the manner described, the apparatus is adapted to carry out the cycle of operation whereby ware is delivered from the take-out mechanism to the belt of the lehr as heretofore explained.

If it is desired to operate the conveyor of the escalator buck continuously instead of intermittently, the control mechanism disclosed in Figure 11 is employed whereby the conveyor 2 is directly driven from the shaft 70 and operates at a speed corresponding to the speed of operation of the take-out so that the plates or paddles 10 are in proper position to receive the ware at the proper time. With this mode of operation, the transfer arm 40 is intermittently operated in the same manner as in connection with the intermittent operation of the conveyor buck described in connection with Figure 10 of the drawings.

In Figure 5 is disclosed a conveying mechanism which is capable of transferring ware from a higher elevation to a receiving station at a lower elevation instead of from a lower to a higher elevation as shown in Figure 1 of the drawings. The operating mechanism for timing the operation of the conveyor, transfer arm, and lifting device may, of course, be the same as that disclosed in connection with Figures 10 and 11 of the drawings.

In Figures 14 and 15 a different form of actuating mechanism is employed for advancing the endless conveyor chain than that described in connection with Figure 1 of the drawings.

The purpose of the modified structure is to eliminate the idle or return stroke of the drive cylinder to adapt the conveyor for a high speed bottle machine.

The frame construction is substantially the same as that shown in Figure 1, frame 5 being mounted on wheels 6 movable on rails 7 by means of the screw shaft 8. Instead of employing the hand adjusting wheel 9 as in Figure 1, a hand wheel 60 is provided which is journalled in an upright frame member 61 and is operatively connected to a sprocket chain 62 to operate the screw shaft 8 whereby the entire escalator buck is movable longitudinally on the supporting track structure 7.

The drive shaft 3 for the conveyor is provided with a ratchet wheel 63 similar to the wheel 25 employed in Figure 1, and a hand wheel 64, the latter being useful in operating the chain by hand to adjust the longitudinal position of the conveyor paddles with respect to the discharge position of the take-out device 36.

Instead of employing a single pawl element as in the structure of Figure 1, a plurality of pawls 65 and 66 are mounted on levers 65ᵃ and 66ᵃ which are connected by links 68 and 69 to a crank 70 which is pivoted at 71 to the upright frame 61 and at its other end to the piston rod 72 of an actuating cylinder 73.

When the piston member 72 is subjected to a reciprocating movement, the crank 70 will operate the levers 65ᵃ and 66ᵃ through the connecting links 68 and 69 to subject them to oscillating movement about the drive shaft 3. In one direction of movement, as for example on the upstroke of the piston member 72, the pawl 66 will engage the teeth of the ratchet 63 and advance the drive shaft 3 a given amount. During this movement, the pawl 65 will slide over the teeth of the ratchet wheel 63 to effect engagement and on the subsequent return strokes of the piston member 72, the pawl 65 will engage the teeth of the ratchet wheel and advance the same subjecting the shaft 3 to angular movement to again advance the conveyor belt. During this downward movement, the pawl 66 will idle over the ratchet teeth.

The movement of the conveyor is controlled by two ports and a group of valve connection at each end of the operating cylinder 73. One port is provided in the cylinder head 74 leading under the piston. The other port is in the cylinder wall and placed in less distance from the end of cylinder than the length of the piston travel. In other words, the second port will, at times, be entirely sealed by the passing piston and remain so until the next stroke takes place. The object of this arrangement is to provide a double control of the exhausting air. A needle valve 75 controls the air escaping through the port in the cylinder head 74 and a needle valve 76 controls the air escaping through the port in the cylinder wall. A check valve 77 permits passage of air only towards the cylinder and is rendered operative when the cycle is reversed. This end of the cylinder is then connected to a source of air pressure and the opposite end of the cylinder is simultaneously exhausted. At the beginning of the stroke, air escapes through valves 75 and 76 and towards the end of the stroke the port in the side wall of the cylinder 73 becomes sealed by the piston, and the air escapes through valve 75 only, thus effecting a cushioning of the stroke which is not available if only one needle valve were employed. The bottom of the operating cylinder 73 is similarly provided with valves 75' and 76' and a check valve 77' which are operative in the same manner as described.

From the foregoing description of the invention it will be apparent that the apparatus disclosed herein provides a simple and efficient method for leveling the supporting plates of an escalator buck directly under the take-out mechanism and for providing adjustable means for centering the ware supporting plates with the ware after the adjustment for height or level has been made. It is further evident that the present apparatus provides means for intermittently operating an escalator buck so that the ware receiving plates or paddles may be made to stop at predetermined vertical and horizontal location under the forming machine take-out without changing the angle of inclination of the escalator.

Although one embodiment of the invention has been herein illustrated and described it will be obvious to those skilled in the art that various modifications may be made in the details of construction without departing from the principles herein set forth.

I claim:

1. Ware-transferring mechanism comprising, in combination, a ware delivering device and an escalator buck for receiving the ware consisting of an endless conveyor chain having ware-supporting paddles mounted thereon, means for driving the conveyor step by step roller guide means for maintaining and supporting said paddles in horizontal position, means for adjustably moving said escalator buck longitudinally on its support relative to said ware-delivering mechanism, and means independent of said first named means for moving the conveyor chain along the escalator buck to center the said ware-supporting paddles with said delivering mechanism.

2. Ware-receiving and transferring apparatus, comprising in combination, a ware delivering means operating in a fixed vertical plane, an escalator buck consisting of an endless chain having ware-supporting paddles mounted thereon, means for moving said escalator buck longitudinally on its support and means for adjusting said ware-supporting paddles to center them with the ware-delivering mechanism whereby the distance between the surface of the paddles and the ware-engaging means of the delivering mechanism is varied.

3. Ware-transferring mechanism comprising a ware-delivering device operating in a fixed horizontal plane and being adjustable to deliver glassware of different lengths to a conveyor, an escalator buck having an endless conveyor movable step by step and provided with ware-supporting paddles adapted to receive the ware from said delivering device and transfer the same to a receiving station at a fixed level above the level at which the ware was received on said buck, means for adjusting the longitudinal position of the buck to vary the level of said paddles relative to said delivering device and means independent of said last named means for adjusting the vertical and horizontal position of said paddles relative to said ware-delivering device.

4. A ware-transferring mechanism comprising an escalator buck having an endless chain, a plurality of roller shafts carried by said chain, the rollers of which are disposed in guides, ware-supporting paddles mounted on said shafts having guide means for maintaining the ware-supporting surface in horizontal position, means for actuating said conveyor and means independent of said actuating means for indexing said paddles on the escalator buck.

5. In a ware handling apparatus the combination of an escalator buck, a pair of shafts journalled therein with their axes in vertical and longitudinal spaced relation, an endless conveyor chain disposed around and movable by said shafts, work supporting members mounted on said chain, means for moving the entire buck longitudinally relative to a ware receiving station to vary the elevation of the work supporting members at the receiving station, means for actuating said conveyor chain to successively move said work supporting members in register with the ware receiving station, and means operable independently of said chain actuating means for centering said work supporting members with the center of the ware at the ware receiving station after moving the buck to receive ware of different length.

6. In a ware-handling apparatus, the combination of an escalator buck, a pair of shafts journalled therein with their axes in vertical and longitudinal spaced relation, an endless conveyor chain disposed around and movable by said shaft, work supporting members mounted on said chain to be movable thereby, means for supporting the work supporting members on the escalator buck, means for actuating the conveyor chain to successively and intermittently move said work-supporting members for a distance corresponding to the spacing of said members on the chain, means for moving the buck longitudinally relative to a ware delivery station to adjust the elevation of the work supporting members relative to a ware delivery level at said station, and means operable independently of the actuating means for re-indexing said work-supporting members with the delivery station after moving the buck.

7. A ware handling and receiving apparatus comprising the combination with an escalator buck, of an endless conveyor mounted thereon, said conveyor having a plurality of ware receiving members, a ware receiving station, a ware delivery station, means for moving the entire apparatus relative to the delivery station to vary the vertical level of the ware receiving members at the receiving station, and adjustable means independent of the driving means to move the members relative to the delivery station to bring them initially into register at said station to enable said members to receive the ware.

8. In ware handling apparatus, the combination of a movable escalator buck, a sequence of ware supporting members, adapted to be brought singly in register with a ware delivery station and in series with a ware discharge station, a conveyor mounted for movement on said buck and for supporting the said members, means for moving the buck horizontally to alter the elevation at which the ware is delivered to the conveyor and members thereon and separate means for simultaneously indexing the members with the delivery and discharge stations.

9. In ware handling apparatus, the combination of a movable escalator buck having a fixed inclined receiving portion and a fixed horizontal discharge portion, of a conveyor adapted to be moved along said buck, of a sequence of uniformly spaced ware supporting members attached to said conveyor, of a ware delivering device adjacent the inclined portion adapted to deliver articles of varying length to the ware supporting members, of a fixed ware discharge station, of means for indexing the members with the delivery device and the ware delivery station, and means to move the ware supporting members horizontally relative to the delivery station to vary the elevation of the members when in register at the delivery station relative to the elevation at the ware discharge station.

HAROLD A. MOORE.
CARL A. NIELSEN.